United States Patent [19]

Mannschke

[11] Patent Number: 4,660,973
[45] Date of Patent: Apr. 28, 1987

[54] ARRANGEMENT FOR LOCATING FAULTS IN AN OPTICAL INFORMATION TRANSMISSION SYSTEM

[75] Inventor: Lothar Mannschke, Eckental-Eckenhaid, Fed. Rep. of Germany

[73] Assignee: U.S. Philips Corporation, New York, N.Y.

[21] Appl. No.: 510,841

[22] Filed: Jul. 5, 1983

[30] Foreign Application Priority Data

Jul. 3, 1982 [DE] Fed. Rep. of Germany ....... 3224998

[51] Int. Cl.$^4$ .................. G01N 21/88; H04B 9/00
[52] U.S. Cl. .................. 356/73.1; 455/601; 455/606
[58] Field of Search .............. 356/73.1; 455/601, 606

[56] References Cited

U.S. PATENT DOCUMENTS 4,300,239 11/1981 Wakabayashi et al. ........ 356/73.1 X
4,313,224 1/1982 Wakabayashi et al. ........ 455/606 X

FOREIGN PATENT DOCUMENTS 3042815 5/1982 Fed. Rep. of Germany ..... 356/73.1
56-78247 6/1981 Japan ............................ 455/601

Primary Examiner—Vincent P. McGraw
Attorney, Agent, or Firm—Thomas A. Briody; William J. Streeter; Leroy Eason

[57] ABSTRACT

In order to locate faults in an optical transmission system, the optical waveguide in the forward transmission path of a repeater is coupled by a beam splitter to an optical waveguide loop at the output of an amplifier. The dividing ratio of the beam splitter is based on the sensitivity of the amplifier in the return transmission path of the repeater. In the return direction the optical waveguide loop is connectable instead of the optical waveguide of the return transmission path.

5 Claims, 2 Drawing Figures

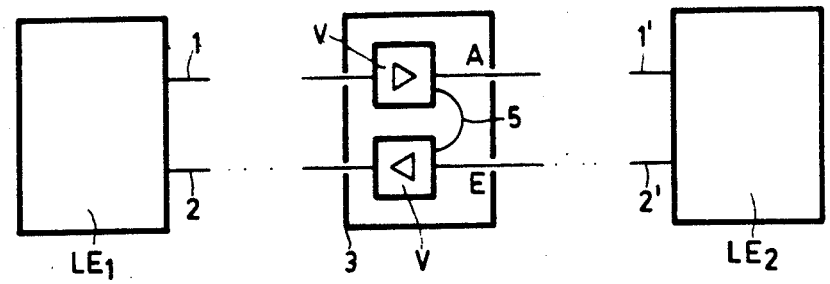
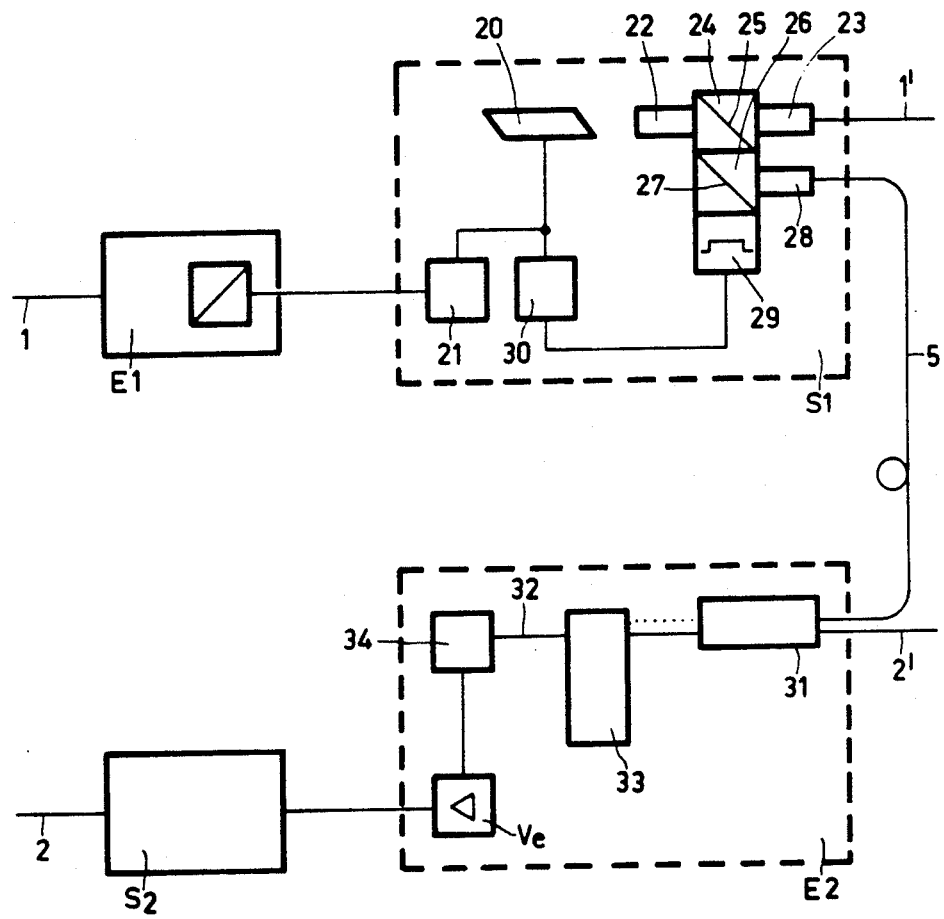

ARRANGEMENT FOR LOCATING FAULTS IN AN OPTICAL INFORMATION TRANSMISSION SYSTEM

BACKGROUND OF THE INVENTION

1. Field of the Invention

The invention relates to an arrangement for locating faults in an optical transmission system, comprising at least one fault-locating line terminal device and at least one (intermediate) repeater, in which an optical a loop is connectable between the output in the forward direction and the input in the return direction, so that signals coming from the fault-locating line terminal device can also be sent in the return direction. Thereby the faulty line sections and/or the repeaters can be located in the direction away from the fault-locating terminal device.

2. Description of the Related Art

Optical loops for locating faults in optical transmission paths have already been contemplated, but they have been rejected as the necessary prerequisites were not satisfied. (DE-OS 29 04 057). Consequently, the use of optical loops between the optical output and the optical input within a repeater was not considered practicable.

SUMMARY OF THE INVENTION

The invention has for its object to establish, for locating faults in an optical information transmission system, the conditions necessary for the use of an optical loop in a repeater in order to include therein all the optical components of this repeater.

According to the invention, this object is accomplished in an arrangement described in the opening paragraph in that an optical connection is coupled at the output of a branch at which a portion of the signal transmitted by the fault-finding terminal unit is branched-off, and that the optical connection is connected to the input of the return path, instead of to the input of the optical waveguide of the transmission path.

The invention is based on the recognition that a portion of the light can be branched off by a splitter to provide a control signal for the optical amplifier, when different sensitivities of the receiver are taken into account. Namely, in optical splitters, the light to be branched-off cannot be reduced adequately for the benefit of the through-going signals, due to production-technical reasons in the manufacture of splitters.

The invention can be used advantageously in optical transmission systems in which purely optical amplifiers are used.

BRIEF DESCRIPTION OF THE DRAWINGS

The invention will now be further described with reference to the accompanying drawing and the embodiments schematically shown therein, and to advantageous embodiments described in the sub-claims.

Therein:

FIG. 1 shows schematically a cross-sectional view of an optical transmission system, FIG. 2 is a block diagram of a repeater of the transmission system shown in FIG. 1.

DESCRIPTION OF THE PREFERRED EMBODIMENTS

In the transmission system shown in FIG. 1, a cable comprising optical waveguides 1 and 2 leads from the fault-locating line terminal device LE1 to a repeater 3 comprising amplifiers V for each transmission direction. Repeaters are arranged in the path to the remote line terminal device LE2 at distances which are determined by the transmitter power, the quality of the junctions and the optical waveguides, as well as by the transmission frequency used.

In the repeater 3 an optical waveguide 5, which forms an optical loop, is arranged between the output A of the amplifier for one transmission direction and the input E of the amplifier for the other transmission direction. FIG. 2 shows the loop in detail.

In the embodiment shown in FIG. 2 electrical amplifiers are used, arranged between electro-optical converters. The opto-electrical converter at the input is combined with an electrical amplifier into a receiving module E1. In this receiving module the incoming signal is amplified and regenerated, if required. A transmitting stage E1 is connected to the receiving module S1.

The transmitting stage S1 comprises a junction semiconductor laser 20, which is modulatable by means of a drive module 21. A gradient rod lens (GRIN-lens) 22 which directs the signal to an optical waveguide LWL 1', is connected to the output of the junction laser.

The coupling between the output of a laser 20 and optical waveguide 1' via GRIN-lens 22 is completed by a second GRIN-lens 23, a first optical splitter 24 being arranged between the GRIN-lenses 22 and 23. The splitter is in the form of a glass cube having a beam splitting layer in one diagonal plane. Approximately 2% of the light passing through the cable is split-off, whereas the major portion of the light (98%) is substantially fully transmitted.

A beam splitting cube can, for example, be obtained by cementing two cube halves having a triangular cross-section together, the adhesive layer of which is provided with a beam splitting layer. It will be evident that alternatively other beam splitters than those shown in the drawing can be used.

The branched-off light can be directly applied, via an opto-electronic converter 29, to a control module 30, which acts together with the drive module 21 on the semiconductor laser. Temperature-dependent fluctuations in the output power of the semiconductor laser are compensated for by this control.

A further beam splitter 26 is arranged between the beam splitter 24 and the opto-electronic converter 29. This beam splitter 26 is provided with a beam-splitting layer 27, which divides the split-off light portion (2%) into two; these light portions may also be in the ratio of 98 to 2%.

98% of the 2% of the output power of the semiconductor laser 20, split-off in the beam splitter 24 are sufficient for the control. The remaining 2% (of 2%) is coupled to optical waveguide 5 via the GRIN-lens 28. The light intensity is thereby reduced by the twofold beam splitting action to a level corresponding to the sensitivity of the receiver in the return direction.

The optical waveguide 5 is connected to the receiving or return amplifier E2, which is contained, together with the transmission amplifier S1, in a common sleeve. The transmission signal is applied via the optical waveguide 2', which is tightly coupled, together with the optical waveguide 5, to one face of the GRIN-lens 31 in the amplifier E2 of the return path. The coupling positions are located outside the face centres. Because of the transmission properties of the GRIN-lens 31, the light beams from the optical waveguides 5 and 2' are emitted from different areas of the opposite face of the lens, to which areas the end of an optical waveguide 32 can optionally be directed by means of a the relay 33. The other end of the optical waveguide 32 is connected to an opto-electronic converter 34, to which the transmission module responds via the electrical amplifier Ve.

The return path transmission module S2 may be the same as the forward path module S1, which is shown in detail, and may comprise a loop circuit in the event that the remote line terminal device LE2 mus also effect a fault-locating operation in the return direction. However, for practical reasons, loop circuits which can be closed from a line terminal device are usually considered sufficient.

As in normal circumstances no fault locating operation is effected, relay 33 is a monostable relay for directing the optical waveguide 32 to the area on the GRIN-lens 31 in which the (transmission) signal from optical waveguide 2 is present. In the on-position, the relay 33 shifts the optical waveguide 32 to the position shown by means of a dotted line. Then the waveguide 32 is in the exit position of the (locating) signal radiated into it by the waveguide 5. Consequently, the optical loop is only closed by waveguide 32 when the relay 33 is in the on-position. With loops of this type it is possible to test all types of optical modules contained in a, sleeve, which is one of the objects of the invention.

What is claimed is:

1. In an arrangement for locating faults in an optical transmission system having forward and return transmission paths, such arrangement comprising: a fault-locating line terminal device (LE1), a repeater (3), and an optical waveguide loop (5) connected betwen the output of the repeater in the forward transmission direction and the input of the repeater in the return transmission direction, so that optical signals coming from the fault-locating terminal device in the forward direction can also be sent in the return direction; the improvement characterized in that: first optical beam splitting means (24) is coupled to said forward transmission path for diverting a small proportion of said optical signals from that path; second optical beam splitting means (26) is coupled in series with said first optical beam splitting means to receive therefrom the diverted optical signals and to further divert a small proportion of the already diverted signals; and said waveguide loop (5) is coupled between said second optical beam splitting means and the input of said repeater (3), whereby only the twice diverted proportion of the optical signals coming from the fault-locating terminal device are branched-off to said loop; and means (33) for selectively connecting the return direction input of the repeater to said loop instead of to the return transmission path.

2. An arrangement as claimed in claim 1 wherein the beam splitting means (24, 26) splits the optical signals in proportion of approximately 98% to the forward transmission path and 2% to said loop.

3. The arrangement as claimed in claim 1 further comprising a pair of gradient rod lenses (22, 23) for coupling said first beam splitting means (24) to said forward transmission path.

4. An arrangement as claimed in claim 1 wherein at the return direction unit of the repeater there is provided a gradient rod lens (31) to one face of which is coupled an optical waveguide (2') in the return transmission path and the optical waveguide loop, and to the opposite face of which is coupled an optical waveguide (32); and further comprising an opto-electric converter (34) connected to waveguide (32) for selectably controlling the directional coupling between the faces thereof.

5. An arrangement as claimed in claim 4, characterized in that the optical waveguie (32) is directable by means of a relay.

* * * * *